United States Patent [19]

Kuroishi et al.

[11] Patent Number: 5,216,040
[45] Date of Patent: Jun. 1, 1993

[54] RIGID POLYURETHANE FOAM AND PROCESS FOR PRODUCING THE SAME

[75] Inventors: Kazuyoshi Kuroishi; Reishi Naka; Isao Kobayashi; Kousuke Tanaka; Katuhiko Gotoo, all of Tochigi, Japan

[73] Assignee: Hitachi, Ltd., Tokyo, Japan

[21] Appl. No.: 617,005

[22] Filed: Nov. 21, 1990

[30] Foreign Application Priority Data

Feb. 20, 1990 [JP] Japan .................. 2-037370

[51] Int. Cl.$^5$ .................. C08J 9/14; C08K 5/02; C08G 18/28
[52] U.S. Cl. .................. 521/131; 521/115; 521/128; 521/155; 521/164; 521/167; 521/173; 521/175; 521/177
[58] Field of Search .......... 521/164, 167, 129, 110, 521/112, 115, 131, 159, 173, 175, 177, 128

[56] References Cited

U.S. PATENT DOCUMENTS

| | | | |
|---|---|---|---|
| 4,302,551 | 11/1981 | Morn et al. | 521/164 |
| 4,310,632 | 1/1982 | Horacek et al. | 521/129 |
| 4,394,463 | 7/1983 | Cuscurida et al. | 521/167 |
| 4,500,656 | 2/1985 | Rasshofer et al. | 521/164 |
| 4,742,089 | 5/1988 | Naka et al. | 521/164 |

FOREIGN PATENT DOCUMENTS

| | | |
|---|---|---|
| 0091828 | 10/1983 | European Pat. Off. |
| 0293060 | 11/1988 | European Pat. Off. |
| 0330988 | 6/1989 | European Pat. Off. |
| 0392668 | 10/1990 | European Pat. Off. |
| 0397378 | 11/1990 | European Pat. Off. |

*Primary Examiner*—John Kight, III
*Assistant Examiner*—John M. Cooney, Jr.
*Attorney, Agent, or Firm*—Antonelli, Terry, Stout & Kraus

[57] ABSTRACT

A rigid polyurethane foam obtained by foaming a special polyol component and an isocyanate component in the presence of a blowing agent comprising water and at least one member selected from the group consisting of 1,1-dichloro-2,2,2-trifluoroethane and 2,2-dichloro-2-monofluoroethane possesses balanced excellent properties, has no surface void, and shows only slight expansion after molding. Therefore, it can be effectively used as a heat insulator, in particular, a heat insulator for refrigerators.

9 Claims, 1 Drawing Sheet

5,216,040

RIGID POLYURETHANE FOAM AND PROCESS FOR PRODUCING THE SAME

BACKGROUND OF THE INVENTION

This invention relates to a rigid polyurethane foam which has excellent physical properties, does not contain particularly a surface void and shows only slight expansion after molding; a process for producing such a rigid polyurethane foam; and products obtained by application of such a rigid polyurethane foam.

Rigid polyurethane foams are usually obtained by reacting a polyol component and an isocyanate component in the presence of a blowing agent, a reaction catalyst and a foam stabilizer. In general, for obtaining a closed-cell rigid polyurethane foam excellent in heat-insulating properties with high productivity, there is conventionally used, as the above blowing agent, trichloromonofluoromethane having excellent characteristics, for example, in that it gives a very low thermal conductivity of gas, has a low boiling point, and is liquid at ordinary temperature, noncombustible and low in toxicity. As a prior art reference concerning a production process of such a rigid polyurethane foam, there is known, for example, Japanese Patent Unexamined Publication No. 59-84913.

Trichloromonofluoromethane ($CCl_3F$) conventionally used as the blowing agent is one of hardly decomposable CFC's (an abbreviation of chlorofluorocarbons; substituted hydrocarbons having chlorine and fluorine as the substituents). It is considered that when such a hardly decomposable CFC is released into the atmosphere, it acts to destroy the ozone layer in the stratosphere or cause rise of earth surface temperature due to so-called greenhouse effect. Thus, employment thereof has posed a global environmental pollution problem in recent years. In the future, the production and consumption of the hardly decomposable CFC's are to be restricted in stages, and a method for reducing their use is a serious problem. Therefore, substitutes for the hardly decomposable CFC's are being chosen all over the world. As hopeful substitutes, there have been proposed 1,1-dichloro-2,2,2-trifluoroethane and 2,2-dichloro-2-monofluoroethane which are easily decomposable HCFC's (hydrochlorofluorocarbons). However, although there have been investigated various rigid polyurethane foams obtained by use of these compounds, there has not yet been obtained a rigid polyurethane foam having a good balance in physical properties, in particular, such a polyurethane foam which has no surface void and shows only slight expansion after molding.

SUMMARY OF THE INVENTION

An object of the present invention is to provide a rigid polyurethane foam which is well balanced in physical properties, does not have particularly a surface void and shows only slight expansion after molding, by using HCFC as a blowing agent.

Another object of this invention is to provide a process for producing such a rigid polyurethane foam, and a process for using such a rigid polyurethane, for example, as a heat insulator or for refrigerators.

The present invention provides a rigid polyurethanes foam obtained by reacting a polyol component with an isocyanate component in the presence of a blowing agent comprising water and 1,1-dichloro-2,2,2-trifluoroethane and/or 2,2-dichloro-2-monofluoroethane, said polyol component being a mixed polyol composition comprising (A) 48 to 52% by weight of a polyol obtained by adding propylene oxide and ethylene oxide to tolylene-diamine,
(B) 10 to 14% by weight of a polyol obtained by adding ethylene oxide to bisphenol,
(C) 13 to 17% by weight of a polyol obtained by adding propylene oxide to trimethylolpropane,
(D) 9 to 13% by weight of a polyol obtained by adding propylene oxide to sucrose, and
(E) 10 to 14% by weight of a polyol obtained by adding propylene oxide and ethylene oxide to diethanolamine, and said isocyanate component being a mixed isocyanate composition comprising
(a) 60 to 90% by weight of polymethylene polyphenyl diisocyanate, and
(b) 10 to 40% by weight of a sucrose tolylene diisocyanate prepolymer.

This invention further provides a process for producing a rigid polyurethane foam which comprises reacting a polyol component with an isocyanate component in the presence of a blowing agent, a reaction catalyst and a foam stabilizer, said blowing agent comprising water and at least one compound selected from 1,1-dichloro-2,2,2-trifluoroethane and 2,2-dichloro-2-monofluoroethane, said polyol component being a mixed polyol composition comprising (A) 48 to 52% by weight of a polyol obtained by adding propylene oxide and ethylene oxide to tolylene-diamine,
(B) 10 to 14% by weight of a polyol obtained by adding ethylene oxide to bisphenol,
(C) 13 to 17% by weight of a polyol obtained by adding propylene oxide to trimethylolpropane,
(D) 9 to 13% by weight of a polyol obtained by adding propylene oxide to sucrose, and
(E) 10 to 14% by weight of a polyol obtained by adding propylene oxide and ethylene oxide to diethanolamine, said mixed polyol composition having an average OH value of 440 to 470, and said isocyanate component being a mixed isocyanate composition comprising
(a) 60 to 90% by weight of polymethylene polyphenyl diisocyanate, and
(b) 10 to 40% by weight of a sucrose tolylene diisocyanate prepolymer, said mixed isocyanate composition having an average NCO % of 31 to 33.

This invention still further provides a process for using said rigid polyurethane foam, for example, as a heat insulator or for refrigerators.

DESCRIPTION OF THE PREFERRED EMBODIMENTS

Figure 1A:
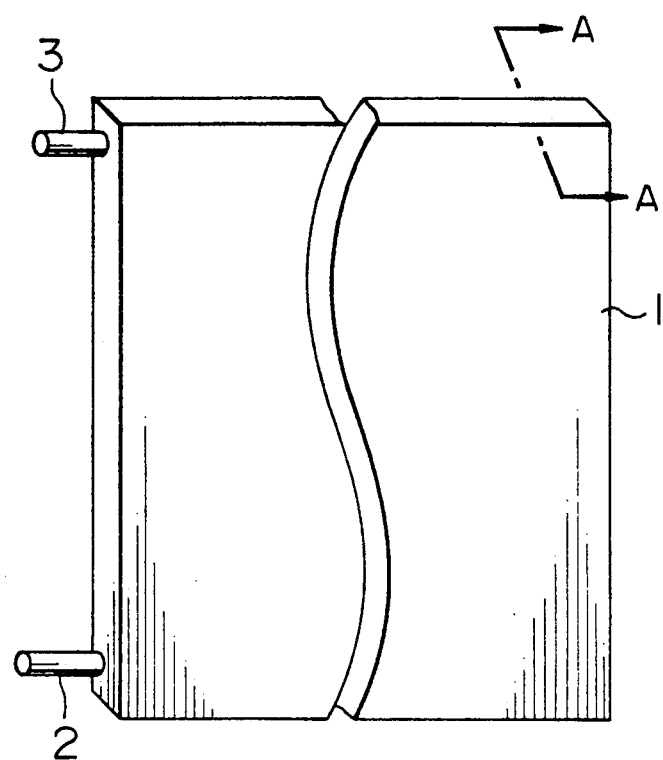
FIGS. 1(a) and (b) are schematic and cross-sectional views showing the production of a heat insulator which is exemplified in Example 7 of the present invention.

The present invention is characterized by using as a blowing agent, water and at least one member selected from the group consisting of 1,1-dichloro-2,2,2-trifluoroethane and 2,2-dichloro-2-monofluoroethane in place of trichloromonofluoromethane, and a combination of a specific mixed polyol composition and a specific mixed isocyanate composition. The rigid polyurethane foam obtained by the combined use of such compositions has a density of 20 to 23 kg/m$^3$ in terms of free foam density, and its thermal conductivity can be maintained at $15.0 \times 10^{-3}$ kcal/m.hr.°C. or less, preferably 13.0 to $14.0 \times 10^{-3}$ kcal/m.hr.°C. Its compression strength can be maintained at 0.8 kg/cm$^2$ or more, preferably 0.9 kg/cm$^2$ or more, its rate of low-temperature dimentional change at 1% or less at −20° C., and the mold release time at 6 minutes or less, preferably 5 minutes or less. In addition, according to the present invention, there can be attained physical properties which are in no way inferior to those of conventional superior rigid polyurethane foams, and moreover there can be provided a rigid polyurethane foam which has no surface void and shows only slight expansion after molding.

The mixed polyol composition used in the present invention comprises the following components:

(A) 48 to 52% by weight of a polyol obtained by adding propylene oxide and ethylene oxide to tolylenediamine, (B) 10 to 14% by weight of a polyol obtained by adding ethylene oxide to bisphenol, (C) 13 to 17% by weight of a polyol obtained by adding propylene oxide to trimethylolpropane, (D) 9 to 13% by weight of a polyol obtained by adding propylene oxide to sucrose, and (E) 10 to 14% by weight of a polyol obtained by adding propylene oxide and ethylene oxide to diethanolamine.

Said mixed polyol composition has an average OH value of preferably 440 to 470.

In the mixed polyol composition, the individual polyol components seems to have the following effects:

The component (A) is effective for maintaining thermal conductivity.

The component (B) is effective for making foams fine.

The component (C) is effective for improving thermal conductivity and low-temperature dimensional stability.

The component (D) is effective for improving low-temperature dimensional stability, compression strength and mold releasing properties.

The component (E) is effective for improving fluidity.

The average OH value of the mixed polyol composition is preferably 440 to 470. When it is less than 440, the low-temperature dimensional stability is lowered. When it exceeds 470, the friability tends to take place. The OH values outside the above-mentioned preferable range result in defective products and hence lowering of the productivity. An average OH value of 440 to 470 is preferable for producing a stable rigid polyurethane foam.

On the other hand, the mixed isocyanate composition to be reacted with said mixed polyol composition comprises the following components:

(a) 60 to 90% by weight of polymethylene polyphenyl diisocyanate, and (b) 10 to 40% by weight of a sucrose tolylene diisocyanate prepolymer.

Said mixed isocyanate composition has an average NCO percent of preferably 31 to 33%.

In the mixed isocyanate composition, the component (a) is effective for improving mold releasability, and the component (b) is effective for improving compression strength and low-temperature dimensional stability. Particularly when 1,1-dichloro-2,2,2-trifluoroethane or 2,2-dichloro-2-monofluoroethane, or both, are used as a blowing agent, the curing property of foam surface is inferior to that attained by using trichloromonofluoromethane conventionally, so that the mold releasing properties and the compression strength are deteriorated. By using a mixed isocyanate comprising the components (a) and (b) in the above-specified proportions, a rigid polyurethane foam having as excellent compression strength and low-temperature dimensional stability as conventional ones can be obtained without deteriorating the mold releasability. When the NCO percent of the mixed isocyanate composition is less than 31%, the fluidity is lowered. When it exceeds 33%, the low-temperature dimensional stability tends to be deteriorated. Therefore, the NCO percent is preferably 31 to 33% for producing a stable rigid polyurethane foam.

The reaction ratio of the isocyanate component to the polyol component is preferably 1.00 to 1.20, more preferably 1.10, in terms of the ratio of NCO of isocyanate to OH of polyol, viz. NCO/OH. When NCO/OH is less than 1.00, unreacted OH remains, so that the resin strength tends to be extremely lowered to induce shrinkage. When NCO/OH is more than 1.20, a large amount of unreacted NCO remains, so that the resin tends to become brittle.

When any of the components of said polyol composition and said isocyanate composition to be reacted therewith is outside the above-specified proportion range, the object of the present invention cannot be achieved.

Considering, for example, the density, thermal conductivity, compression strength, low-temperature dimensional stability and mold releasing properties of the rigid polyurethane foam, the combination of the following polyol composition and isocyanate composition is the most preferable.

Polyol composition:

(A) 50% by weight of a Polyol obtained by adding propylene oxide and ethylene oxide to tolyelendiamine, (B) 12% by weight of a polyol obtained by adding ethylene oxide to bisphenol, (C) 15% by weight of a polyol obtained by adding propylene oxide to trimethylolpropane, (D) 11% by weight of a polyol obtained by adding propylene oxide to sucrose, and (E) 12% by weight of a polyol obtained by adding propylene oxide and ethylene oxide to diethanolamine, the average OH value of the polyol composition being 450.

Isocyanate composition:

(a) 80% by weight of polymethylene polyphenyl diisocyanate, and (b) 20% by weight of a sucrose tolylene diisocyanate prepolymer, the average NCO percent of the isocyanate composition being 32%.

The rigid polyurethane foam of the present invention can be obtained by reacting said polyol component and said isocyanate component as basic starting materials in the presence of a blowing agent, a reaction catalyst and a foam stabilizer.

In the present invention, as the blowing agent, water is preferably used in an amount of 1 to 2.5 parts by weight per 100 parts by weight of polyol component. In combination with water, there is used an organic blowing agent comprising at least one compound selected from 1,1-dichloro-2,2,2-trifluoroethane and 2,2-dichloro-2-monofluoroethane. The organic blowing agent is used preferably in an amount of 20 to 70 parts by weight per 100 parts by weight of polyol component. When the amount of water used is less than 1 part by weight per 100 parts by weight of polyol component, the compression strength and the low-temperature dimensional stability are low. When it exceeds 2.5 parts by weight, the thermal conductivity tends to be markedly deteriorated.

As the reaction catalyst used in the present invention, there can be favorably used tertiary amines typical examples of which are tetramethylhexamethylenediamine, trimethylaminoethylpiperadine, pentamethyldiethylenetriamine and triethylenediamine. Organotin compounds, etc. may be used together with the tertiary amines. The reaction catalyst is used in an amount of preferably 1 to 7 parts by weight, more preferably 2 to 5 parts by weight, per 100 parts by weight of polyol component.

As the foam stabilizer, there can be used conventionally used organosilicon compounds, fluorine-containing compounds, etc. The foam stabilizer is used in an amount of preferably 0.5 to 5 parts by weight, more preferably 1.5 to 3 parts by weight, per 100 parts by weight of polyol component.

The composition for producing rigid polyurethane foams may, if necessary, further contain conventional additives such as fire retardants, fillers, reinforcing fibers, colorants, etc.

The rigid polyurethane foam of the present invention can be produced by various conventional processes such as one-shot process, semi-prepolymer process, prepolymer process, spray process, etc. Of these, the one-shot process is preferred.

Foaming for production of the polyurethane foam can be carried out by means of a conventional foaming machine used in the art, for example, Model PU-30 manufactured by Promat AG. Although foaming conditions are somewhat varied depending on the kind of foaming machine, they are usually preferably as follows; liquid temperature: 18-30° C., pouring pressure: 80-150 kg/cm$^2$, pouring amount 15-30 kg/min, mold temperature: 35-45° C. More preferable foaming conditions are as follows; liquid temperature 25° C., pouring pressure: 100 kg/cm$^2$, pouring amount: 25 kg/min, mold temperature: 40° C.

The rigid polyurethane foams thus obtained have a density of 20 to 23 kg/m$^3$ in terms of free foam density, and their thermal conductivity can be maintained at $15.0 \times 10^{-3}$ kcal/m.hr.°C. or less, particularly 13.0 to $14.0 \times 10^{-33}$ kcal/m.hr.°C. Their compression strength can be maintained at 0.8 kg/cm$^2$ or more, particularly 0.9 kg/cm$^2$, their rate of low-temperature dimensional change at 1% or less at $-20°$ C., and the mold release time at 6 minutes or less, particularly 5 minutes or less. In addition, said rigid polyurethane foams have no void in the surface and show only slight expansion after molding. Therefore, they are very excellent as a heat insulator used for refrigerators. They can be effectively used also as a heat insulator for other electric machines, building structures, vehicles, etc., or as heat insulating molded articles. Furthermore, they can be effectively used also as a material for buoyant articles such as buoys for fishery by taking advantage of their small specific gravity and rigidity.

The present invention will be illustrated in further detail hereinbelow by showing examples thereof in comparison with comparative examples. In the Examples and the Comparative Examples, parts and percents are all by weight unless otherwise specified.

First, an illustration is given below with reference to comparative examples.

COMPARATIVE EXAMPLES 1 TO 3

Foaming and curing were carried out by using 100 parts of polyol components having an average OH value of 450 to 480 listed in Table 1 (PO=propylene oxide, EO=ethylene oxide), 1.5 parts of water and 46 parts of trichloromonofluoromethane (R-11, a trade name, mfd. by Asahi Glass Co., Ltd.), 54 parts of 1,1-dichloro-2,2,2-trifluoroethane (R-123, a trade name, mfd. by Asahi Glass Co., Ltd.) or 37 parts of 2,2-dichloro-2-monofluoroethane (R-141b, a trade name, mfd. by Asahi Glass Co., Ltd.) as blowing agent, 2.5 parts of a mixture of tetramethylhexamethylenediamine (KAO Lizer No. 1, trade name, mfd. by Kao Corp.) and trimethylaminoethylpiperadine (Kao Lizer No. 8, trade name, mfd. by Kao Corp.) in the ratio of 2:1 as catalyst, 1.5 parts of an organosilicon compound (L-5340, mfd. by Nippon Unikar Co.) as foam stabilizer, and necessary amounts of isocyanate components having an average NCO % of 31 (NCO/OH=1.10) listed in Table 1.

EXAMPLES 1 TO 6 AND COMPARATIVE EXAMPLES 4 TO 7

Foaming and curing were carried out by using 100 parts of polyol components having an average OH value of 440 to 470 listed in Table 1, 0.5 to 3.0 parts of water and 34 to 58 parts of 1,1-dichloro-2,2,2-trifluoroethane or 2,2-dichloro-2-monofluoroethane as blowing agent, 0.7 to 1.8 parts pentamethyldiethylenetriamine (Kao Lizer No. 3, a trade name, mfd. by Kao Corp.) and 2.7 parts of a N-substituted imidazole (Minico R-9000, a trade name, mfd. by Katsuzai Chemical Co., Ltd.) as catalyst, 2 parts of an organosilicon compound (SZ-6628, a trade name, mfd. by Nippon Unikar Co.), and necessary amounts of isocyanate components having an average NCO % of 31 to 33 (NCO/OH=1.10) listed in Table 1.

The results obtained are shown in the section of "Properties" in Table 1. In Table 1, the properties were determined as follows.

(1) Free foam density

Density (kg/m$^3$) of each foam obtained by foaming in a mold of $200 \times 200 \times 200$ mm in inside dimensions made of a veneer board.

(2) Panel foam density

Density (kg/m$^3$) of each foam obtained by foaming in a mold of 400 mm wide, 600 mm long and 35 mm thick. (inside dimensions) made of Al at a mold temperature of 40° C.

(3) Thermal conductivity

Thermal conductivity of a panel foam of 200 mm wide, 200 mm long and 50 mm thick was measured at an average temperature of 23.9° C. by means of Anacon Model 88.

(4) Compression strength

Foam strength when a foam of 50 mm in diameter and 35 mm in thickness was compressed by 10%.

(5) Rate of low-temperature dimensional change

The rate of change in thickness direction of a panel foam of 400 mm wide, 600 mm long and 35 mm thick after standing at −20° C. for 24 hours.

(6) Mold release time

The time from the beginning of pouring a liquid composition into a mold till removal of the resulting foam from the mold.

(7) Surface void

Whether a void having a diameter of 20 to 50 mm was formed on the surface of each foam after foaming or not was visually observed.
◯ Substantially none
△ A few voids
x Not a few voids

(8) Foam expansion

After foaming, the resulting foam was taken out of a mold in a mold release time of 5 minutes, immediately after which the difference between the maximum thickness of central portion of the foam and the original thickness was measured as expansion (panel size: 400 mm wide, 600 mm long and 50 mm thick).
⊚:Less than 2.5 mm
◯:2.5–3.0 mm
x:More than 3.0 mm As is clear from Table 1, Comparative Example 1 is a typical example of conventional polyurethane foam in which water and trichloromonofluoromethane are used as blowing agent and added to a conventional polyol composition.

In Comparative Examples 2 and 3, there are used the same conventional polyol and isocyanate compositions as in Comparative Example 1, but only the blowing agent is changed, namely, there is used the same compound as in the present invention, i.e., 1,1-dichloro-2,2,2-trifluoroethane or 2,2-dichloro-2-monofluoroethane, respectively, in place of trichloromonofluoromethane. In both cases, as compared with Comparative Example 1 in which the conventional compound trichloromonofluoromethane is used as blowing agent, the thermal conductivity is higher, the compression strength and the rate of low-temperature dimensional change are deteriorated, and the mold release time is longer. Thus, it can be seen that the characteristics are greatly deteriorated.

Comparative Examples 4 and 5 are undesirable cases where the polyol composition and the blowing agent employed are the same as used in the present invention, but the isocyanate components (a) and (b) are outside the compositional range specified in the present invention. In both cases, the thermal conductivity is improved to be as high at that of conventional polyurethane foams, but in Comparative Example 4 in which the component (b) is not used, the compression strength is 0.7 kg/cm$^2$ and the rate of low-temperature dimensional change is as high as −2.0%. In Comparative Example 5 in which the component (b) is used in an amount beyond the range specified in the present invention, the mold release time is as long as 8 minutes. Therefore, both cases are not desirable.

In contrast, in Examples 1 to 6 in which mixed polyol compositions and mixed isocyanate compositions defined in the present invention are used in combination, and as blowing agent, there are used water and at least either 1,1-dichloro-2,2,2-trifluoroethane or 2,2-dichloro-2-monofluoroethane, the thermal conductivity

TABLE 1

|  |  |  | Comparative Example | | | | | Example | | | | | | Comparative Example | |
|---|---|---|---|---|---|---|---|---|---|---|---|---|---|---|---|
|  |  |  | 1 | 2 | 3 | 4 | 5 | 1 | 2 | 3 | 4 | 5 | 6 | 6 | 7 |
| Polyol | (A) | Tolylenediamine + PO/EO (%) | 65 | 65 | 65 | 50 | 50 | 50 | 50 | 50 | 50 | 50 | 50 | 50 | 50 |
|  | (B) | Bisphenol + EO (%) | — | — | — | 11 | 12 | 12 | 12 | 12 | 12 | 12 | 12 | 12 | 12 |
|  | (C) | Trimethylolpropane + PO (%) | — | — | — | 15 | 15 | 15 | 15 | 15 | 15 | 15 | 15 | 15 | 15 |
|  | (D) | Sucrose + PO (%) | 14 | 14 | 14 | 11 | 11 | 11 | 11 | 11 | 11 | 11 | 11 | 11 | 11 |
|  | (E) | Diethanolamine + PO/EO (%) | 6 | 6 | 6 | 12 | 12 | 12 | 12 | 12 | 12 | 12 | 12 | 12 | 12 |
|  | (F) | Propylene glycol + PO/EO (%) | 15 | 15 | 15 | — | — | — | — | — | — | — | — | — | — |
| Isocyanate | (a) | Polymethylene polyphenyl diisocyanate (%) | 100 | 100 | 100 | 100 | 50 | 60 | 70 | 80 | 90 | 80 | 80 | 80 | 80 |
|  | (b) | Sucrose tolylene diisocyanate prepolymer (%) | — | — | — | — | 50 | 40 | 30 | 20 | 10 | 20 | 20 | 20 | 20 |
| Blowing agent | Water (parts) | | 1.5 | 1.5 | 1.5 | 1.5 | 1.5 | 1.5 | 1.0 | 1.5 | 2.0 | 1.5 | 1.5 | 0.5 | 3.0 |
|  | Trichloromonofluoromethane (parts) | | 46 | — | — | — | — | — | — | — | — | — | — | — | — |
|  | 1,1-Dichloro-2,2,2-trifluoroethane (parts) | | — | 54 | — | 52 | 50 | 50 | 54 | 50 | 45 | — | 30 | 58 | 37 |
|  | 2,2-Dichloro-2-monofluoroethane (parts) | | — | — | 37 | — | — | — | — | — | — | 34 | 14 | — | — |
| Properties | Free foam density (kg/m$^3$) | | 21.5 | 21.3 | 21.4 | 21.6 | 21.4 | 21.5 | 21.7 | 21.8 | 22.0 | 21.6 | 21.8 | 22.0 | 22.0 |
|  | Panel foam density (kg/m$^3$) | | 29.2 | 30.9 | 30.8 | 30.3 | 29.8 | 30.0 | 30.5 | 30.5 | 30.7 | 30.5 | 30.6 | 31.0 | 30.8 |
|  | Thermal conductivity ($10^{-3}$ kcal/m · h · °C.) | | 13.5 | 15.1 | 15.3 | 13.6 | 13.7 | 13.5 | 13.0 | 13.2 | 13.9 | 13.5 | 13.4 | 13.0 | 15.5 |
|  | Compression strength (kg/cm$^2$) | | 0.9 | 0.6 | 0.7 | 0.7 | 1.0 | 0.9 | 0.8 | 0.9 | 0.9 | 0.9 | 0.9 | 0.7 | 1.0 |
|  | Low-temperature dimensional change (%) | | −0.5 | −3.4 | −2.9 | −2.0 | −0.4 | −0.4 | −0.9 | −0.5 | −0.5 | −0.5 | −0.6 | −3.2 | −0.4 |
|  | Mold release time (min) | | 5 | 7 | 7 | 6 | 8 | 6 | 6 | 5 | 5 | 5 | 5 | 7 | 5 |
|  | Surface void | | ◯ | x | x | △ | ◯ | ◯ | ◯ | ◯ | ◯ | ◯ | ◯ | △ | ◯ |
|  | Foam expansion | | ◯ | x | x | ◯ | x | ◯ | ◯ | ⊚ | ⊚ | ⊚ | ⊚ | x | ⊚ | is 13.0 to 13.9×10$^{-3}$ kcal/m.hr.°C. which is substantially the same as in Comparative Example 1 where the conventional compound trichloromonofluoromethane is used as blowing agent. Moreover, it can be seen that the products obtained in Examples 1 to 6 are not at all inferior to the conventional ones also in other properties such as compression strength, low-temperature dimensional change and mold release time. However, as shown in Comparative Examples 6 and 7, when the amount of water used in the blowing agent, is outside the effective range of 1.0 to 2.5 parts specified in the present invention, no desired physical properties can be obtained even if there are used the polyol and isocyanate compositions in the defined range of the present invention. That is, in Comparative Example 6 in which the amount of water used is 0.5 part, i.e. less than 1.0 part, per 100 parts of the polyol composition, the rate of low-temperature dimensional change is as large as −3.2%. In Comparative Example 7 in which the amount of water used exceeds 2.5 parts, the thermal conductivity is as very high as $15.5 \times 10^{-3}$ kcal/m.hr °C. Therefore, both Comparative Examples 6 and 7 are not desirable.

Especially, it can be seen that as shown in Example 3, when there are used a combination of a mixed polyol composition consisting of 50% of the component (A), 12% of the component (B), 15% of the component (C), 11% of the component (D) and 12% of the component (E) as polyol component and a mixed isocyanate composition consisting of 80% of the component (a) and 20% of the component (b) as isocyanate component, and a mixture of water in an amount of 1.5 parts per 100 parts of polyol component and 1,1-dichloro-2,2,2-trifluoroethane as blowing agent, there can be obtained a rigid polyurethane foam which has the best balance of properties such as foam density (including both free foam density and panel foam density), thermal conductivity, compression strength, low-temperature dimensional stability and mold releasing properties, has no surface void, and shows only slight expansion.

As shown in Examples 1 to 6, by using as blowing agent a mixture of a prescribed amount of water and at least one substituent for trichloromonofluoromethane selected from 1,1-dichloro-2,2,2-trifluoroethane and 2,2-dichloro-2-monofluoroethane and by further using the above-shown combination of mixed polyol and isocyanate compositions, there can be obtained an excellent rigid polyurethane foam having a density of 21 to 22 kg/m$^3$ in terms of free foam density and a thermal conductivity of $15.0 \times 10^{-3}$ kcal/m.hr.°C., particularly 13.0 to 14.0 $\times 10^{-3}$ kcal/m.hr.°C. Moreover, such a rigid polyurethane foam can match the conventional products in property requirements (0.8 kg/cm$^2$ or more, particularly 0.9 kg/cm$^2$ or more, in compression strength, 1% or less in the rate of low-temperature dimensional change, and 6 minutes or less, particularly 5 minutes or less, in mold release time). Therefore, it can be effectively used as various heat insulators and has the effect of reducing by 100% the use of CFC which is included in the list of compounds under regulation in use in order to prevent air pollution.

EXAMPLE 7

Figure 1B:
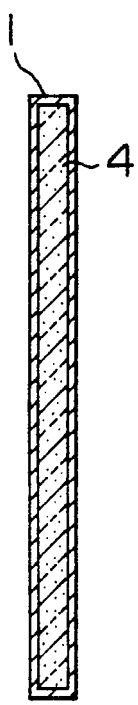

FIG. 1 illustrates an example of application of the rigid polyurethane foam of this invention as a heat insulator used for constituting a wall of a building, casing of a refer or the like. As shown in FIG. 1 (a), a mixed solution containing the starting component materials for forming a rigid polyurethane foam such as used in Examples 1 to 6 is poured into a flat hollow casing 1 made of a metal plate such as aluminum plate from a pouring head 2, and then foamed and cured in the same manner as in Examples 1 to 6 to form an insulating casing having the sectional shape shown in FIG. 1(b). FIG. 1(b) shows a section presented when the casing is cut along the line A—A' of FIG. 1(a). In FIG. 1(b), the hollow portion of the casing is packed with the rigid polyurethane foam 4 formed by the foaming and curing. In the pouring of said mixed solution into hollow casing 1, although not shown in the drawing, a plurality of similar hollow casings are arranged side by side in a thermostatic chamber kept at 35° to 45° C., and after a determined amount of said mixed solution has been poured into each casing, the pouring head 2 is closed. Opening 3 is a gas vent during the time when the mixed solution is being poured into the casing. It also serves as a gas vent during the foaming and curing operations. The thus obtained heat insulating casing can be effectively applied as a wall material for buildings such as houses, a heat insulator consisting the outer wall of a reefer and the like, and for other purposes for which the rigid polyurethane foams have been generally used.

EXAMPLE 8

Figure 2:
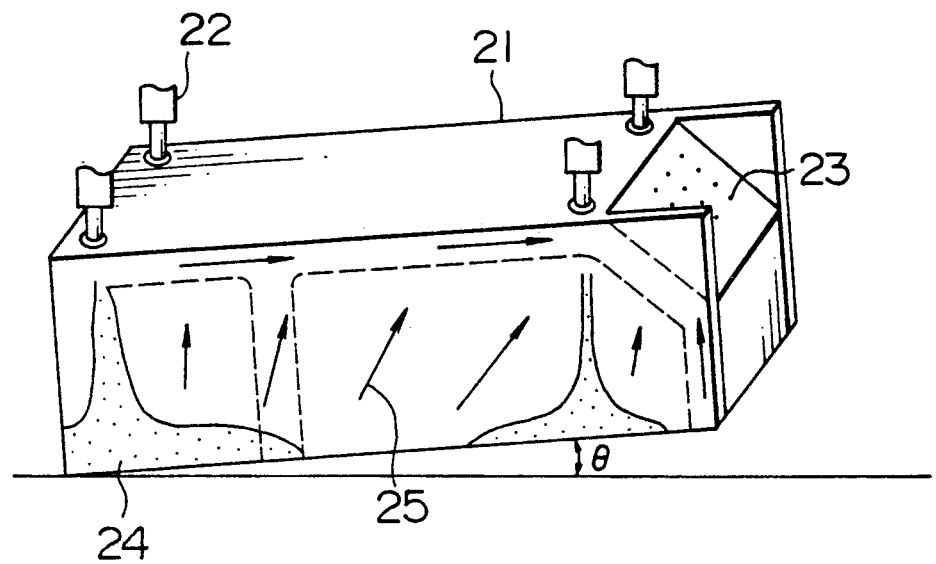
FIG. 2 is a perspective view showing an example of application of the rigid polyurethane foam to an outer case of a refrigerator which is described in Example 8 of the present invention.

FIG. 2 illustrates an example of application of the rigid polyurethane foam of this invention as a heat insulator to be packed in an outer case of a refrigerator. That is, FIG. 2 is by way of illustration and shows schematically the way of packing the hollow portion of an outer case 21 of a refrigerator with rigid polyurethane foam 24.

The procedure for the packing with the rigid polyurethane foam is composed of the following steps.

(1) The refrigerator outer case 21 is properly set in a foaming device (not shown) which has been heated to 35° to 45° C., at an angle of inclination $\theta$ of 10° to 20°.

(2) A stack solution of rigid polyurethane foam, which has been adjusted to a temperature of 18° to 24° C., is poured into the case from the pouring heads 22.

(3) The solution poured into the case is foamed and fills up the refrigerator outer case 21.

(4) After the pouring and the foaming of the stock solution, the foam is after-cured and then released from the mold after about 5 minutes.

In FIG. 2, arrows 25 indicate the direction of flow of the stock solution of rigid polyurethane foam, and numeral 23 denotes gas vents. The refrigerator outer case 21 is held inclined at an angle of $\theta$ by taking into consideration the gas vents and the flowing direction of the stock solution of rigid polyurethane foam. Thus, by using the same stock solution (mixed solution) for rigid polyurethane foam as used in Examples 1 to 6 and by performing foaming and curing in the same manner as in Examples 1 to 6, there can be produced a refrigerator outer case packed with a rigid polyurethane foam having the excellent property values shown in Table 1.

As described above in detail, according to the present invention, a rigid polyurethane foam not at all inferior to conventional products in properties such as insulating properties can be realized without using trichloromonofluoroethane which has been hitherto used as main blowing agent, and instead using easily decomposable HCFC, i.e., 1,1-dichloro-2,2,2-trifluoroethane or 2,2-dichloro-2-monofluoroethane, which are considered to have little effect on the destruction of ozone layer and not included in the list of compounds under regulation in use, with an adequate amount of water. Thus, the desired and including products obtained by application of said rigid polyurethane foam can be attained. In addition, the process for producing a rigid polyurethane foam of this invention has the effect of reducing by 100% the use of trichloromonofluoromethane which is one of hardly decomposable CFC's which are included in the list of compounds under regulation in use in order to prevent air pollution, and moreover it can yield the product equal in performance and quality to the conventional products.

What is claimed is:

1. A rigid polyurethane foam produced by reacting a polyol component with an isocyanate component in the presence of a blowing agent consisting essentially of water in an amount of 1 to 2.5 parts by weight per 100 parts by weight of the polyol component and at least one member selected from the group consisting of 1,1-dichloro-2,2,2-trifluoroethane and 2,2-dichloro-2-monofluoroethane, said polyol component being a mixed polyol composition comprising
   (A) 48 to 52% by weight of a polyol obtained by adding propylene oxide and ethylene oxide to tolylene-diamine,
   (B) 10 to 14% by weight of a polyol obtained by adding ethylene oxide to bisphenol,
   (C) 12 to 17% by weight of a polyol obtained by adding propylene oxide to trimethylolpropane,
   (D) 9 to 13% by weight of a polyol obtained by adding propylene oxide to sucrose, and
   (E) 10 to 14% by weight of a polyol obtained by adding propylene oxide and ethylene oxide to diethanolamine, and said isocyanate component being a mixed isocyanate composition comprising
      (a) 60 to 90% by weight of polymethylene polyphenyl diisocyanate, and
      (b) 10 to 40% by weight of a sucrose tolylene diisocyanate prepolymer,
   wherein the above percent by weight is based on 100% by weight of the polyol (isocyanate) component.

2. A rigid polyurethane foam according to claim 1, wherein said mixed polyol composition has an average OH value of 440 to 470, and said mixed isocyanate composition has an average NCO% of 31 to 33.

3. A rigid polyurethane foam according to claim 1, wherein the ratio of NCO of said isocyanate component to OH of said polyol component, NCO/OH, is 1.00 to 1.20.

4. A rigid polyurethane foam according to claim 1, wherein said at least one member selected from the group consisting of 1,1-dichloro-2,2,2-trifluoroethane and 2,2-dichloro-2-monofluoroethane is in an amount of 20 to 70 parts by weight per 100 parts by weight of the polyol component.

5. A process for producing a rigid polyurethane foam which comprises reacting a polyol component with an isocyanate component in the presence of a blowing agent, a reaction catalyst and a foam stabilizer, said blowing agent consisting essentially of water in an amount of 1 to 2.5 parts by weight per 100 parts by weight of the polyol component and at least one member selected from the group consisting of 1,1-dichloro-2,2,2-trifluoroethane and 2,2-dichloro-2-monofluoroethane, said polyol component being a mixed polyol composition comprising
   (A) 48 to 52% by weight of a polyol obtained by adding propylene oxide and ethylene oxide to tolylene-diamine,
   (B) 10 to 14% by weight of a polyol obtained by adding ethylene oxide to bisphenol,
   (C) 12 to 17% by weight of a polyol obtained by adding propylene oxide to trimethylolpropane,
   (D) 9 to 13% by weight of a polyol obtained by adding propylene oxide to sucrose, and
   (E) 10 to 14% by weight of a polyol obtained by adding propylene oxide and ethylene oxide to diethanolamine, and said isocyanate component being a mixed isocyanate composition comprising
      (a) 60 to 90% by weight of polymethylene polyphenyl diisocyanate, and
      (b) 10 to 40% by weight of a sucrose tolylene diisocyanate prepolymer,
   wherein the above percent by weight is based on 100% by weight of the polyol (isocyanate) component.

6. A process according to claim 5, wherein said mixed polyol composition has an average OH value of 440 to 470, and said mixed polyisocyanate composition has an average NCO % of 31 to 33.

7. A process according to claim 5, wherein said at least one member selected from the group consisting of 1,1-dichloro-2,2,2-trifluoroethane and 2,2-dichloro-2-monofluoroethane is in an amount of 20 to 70 parts by weight per 100 parts by weight of the polyol component.

8. A process for using the rigid polyurethane foam of claim 1 as a heat insulator.

9. A process for using the rigid polyurethane foam of claim 1 for refrigerators.

* * * * *